Feb. 15, 1938. A. FISHER 2,108,662
INDUCTOR DYNAMO-ELECTRIC MACHINE
Filed Feb. 25, 1937  2 Sheets-Sheet 2

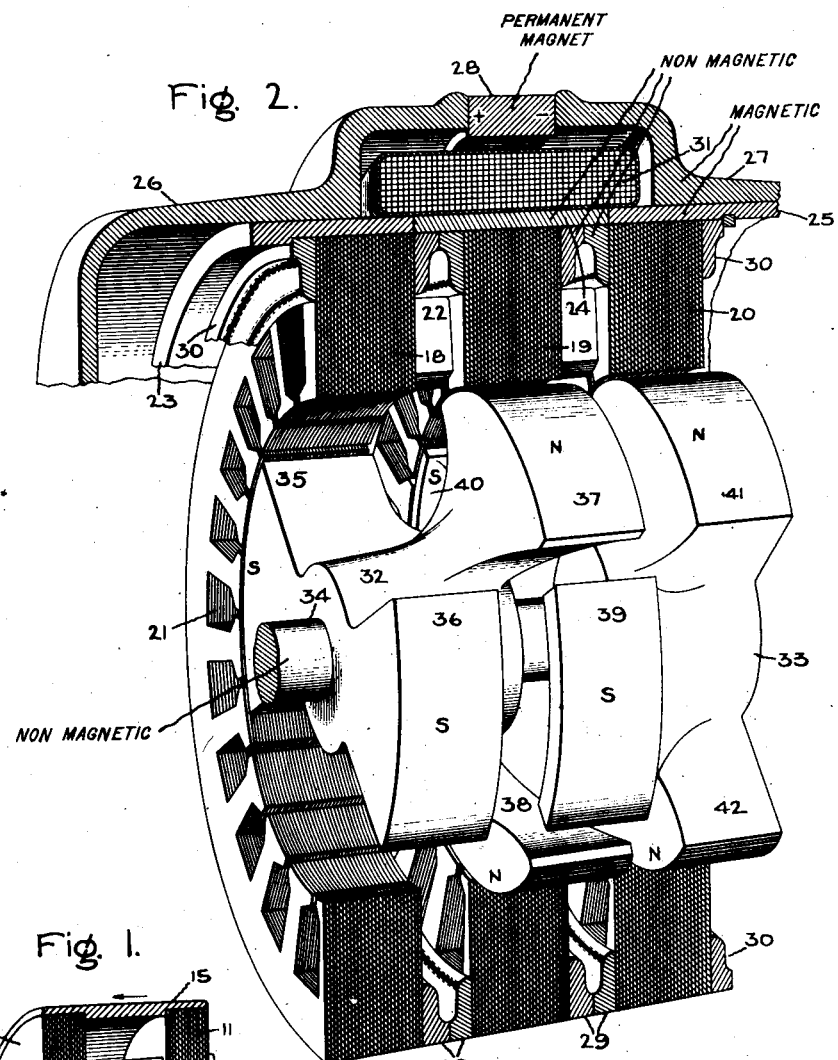
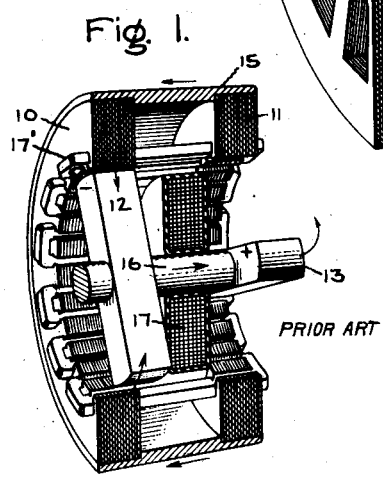

Inventor:
Alec Fisher,
by Harry E. Dunham
His Attorney.

Patented Feb. 15, 1938

2,108,662

UNITED STATES PATENT OFFICE 2,108,662

INDUCTOR DYNAMO-ELECTRIC MACHINE

Alec Fisher, Lynn, Mass., assignor to General Electric Company, a corporation of New York Application February 25, 1937, Serial No. 127,677

12 Claims. (Cl. 171—252)

My invention relates to inductor-type dynamo-electric machines and has for its main object an improved design of machine of this type which permits of a very substantial decrease in the size, weight, and cost of such machines for a given output. Another object of my invention is to provide a self-excited inductor dynamo provided with permanent magnet means for assuring that the voltage of the machine will build up quickly. These two aspects of the invention may be employed independently of each other but may be combined to advantage where a reliable low cost installation is required.

Figure 3:
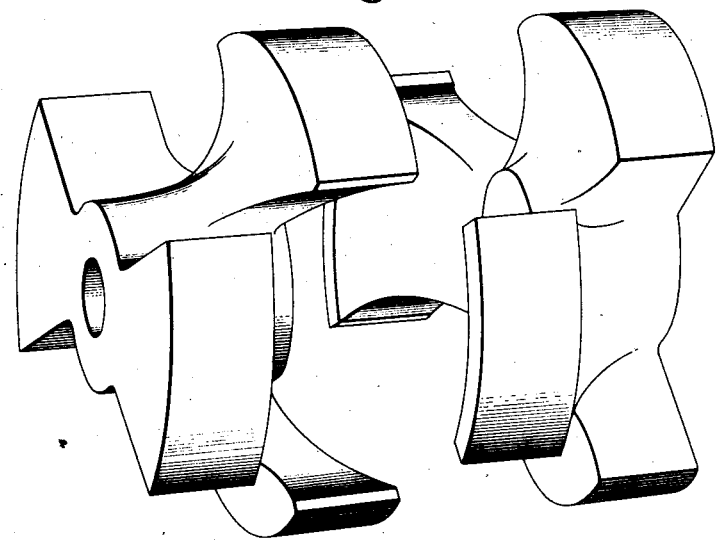
Figure 4:
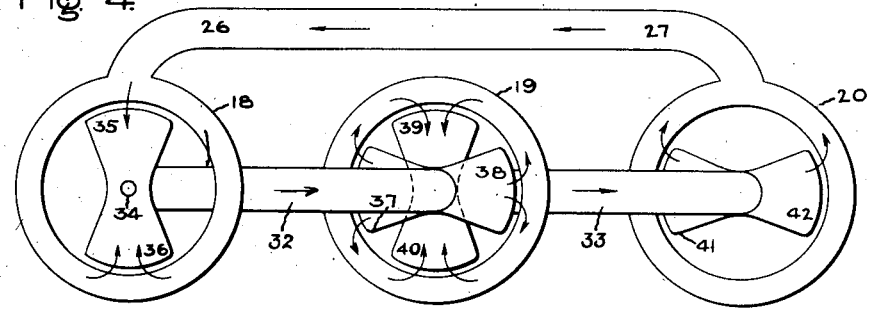
Figure 5:
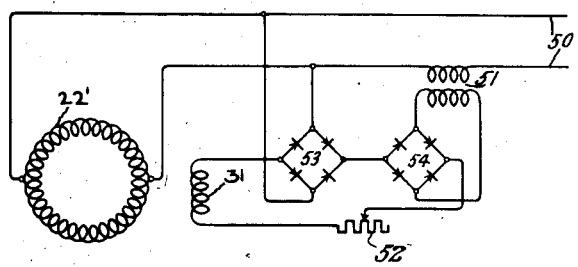
Figure 6:
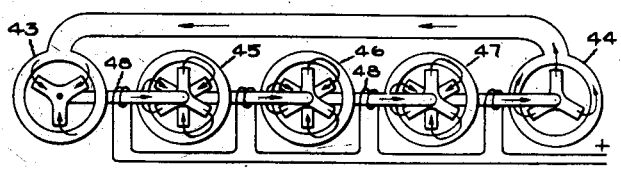

The features of my invention which are believed to be novel and patentable will be pointed out in the claims appended hereto. For a better understanding of my invention, reference is made in the following description to the accompanying drawings in which Fig. 1 represents a simple inductor machine of the prior art which will be helpful in explaining my invention; Fig. 2 is a perspective view, with the stator in section, of an inductor machine embodying my invention; Fig. 3 is a perspective view of the rotor elements of the machine of Fig. 2 with such elements separated axially to the extent necessary to show their structural shapes; Fig. 4 is a schematic representation of the machine of Fig. 2 and the unidirectional flux paths therethrough; Fig. 5 represents the electrical connections where the machine is self-excited; and Fig. 6 is a schematic representation of a further modification of my invention illustrating how the invention may be extended to use any desired number of stator sections per machine.

In explaining my invention, it will be helpful to refer briefly to the simple form of prior art inductor machine shown in Fig. 1. Here is represented a four-pole inductor machine having a pair of axially displaced stator sections 10 and 11 cooperating with a pair of axially displaced rotor sections 12 and 13. The peripheries of the stator sections are magnetically connected by the shell 15 and the centers of the rotor sections are connected by the magnetic hub 16. 17 is a field coil to be energized by direct current for producing a unidirectional flux serially through the stator and rotor sections, as indicated by the arrows. The poles of the two rotor sections are staggered and the poles of one section are positive poles and those of the other section negative. The stator is provided with an alternating-current winding having coils 17' common to both sections. It is seen that, in this four-pole arrangement, only relatively small portions of the stator section peripheries are utilized at any given instant. Thus, those portions of the inner periphery of stator section 10 which are at the moment opposite the poles of the rotor section 12 carry flux and are being utilized but other portions are idle at such moment. Thus, in this type of machine, not more than half of the stator air-gap surface is being utilized at any given instant and this means a correspondingly large, heavy, expensive machine for a given output. According to my invention, the percentage of the momentarily idle magnetic material in this general type of machine may be very materially reduced as will now be explained in connection with Figs. 2 to 6, inclusive.

In the form of the invention represented in Fig. 2, three stator elements or sections 18, 19, and 20 are provided. These sections are made of laminated magnetic material and have slots 21 in their inner peripheries. These slots are in axial alignment in the different sections and contain an alternating-current winding, the coils of which are common to all of the sections and the coil sides of which are straight and, hence, extend through aligned slots, as indicated by the coil section 22 contained in one set of the aligned slots. The details of the alternating-current winding system have not been shown since they may be similar to those used in previous inductor machines.

The three stator sections 18, 19, and 20 are supported in a shell structure, the exact details of which are not important but which, in the illustration, comprises inner shell sections 23, 24, and 25, individually supporting the three sets of laminations, and an outer shell structure comprising the parts 26 and 27 separated by a ring-shaped permanent magnet 28. The shell parts 23, 25, 26, and 27 are made of magnetic material but the shell part 24, supporting the middle stator section, is made of nonmagnetic material. The spacer rings 29 are also made of nonmagnetic material. The end retaining rings 30 may be of magnetic material but this is not essential.

The important feature about this construction is that the inner stator section 19 is magnetically segregated or spaced from the other stator sections 18 and 20 and from the outer magnetic shell structure 26, 27, 28, and the outer stator sections 18 and 20 are connected magnetically by the outer shell structure. In this instance, the shell sections 26 and 27 are enlarged over the central part of the machine to make room for the direct-current exciting winding 31, which surrounds the machine and produces a unidirectional flux generally axially of the machine. Where the machine is to be self-excited, as hereinafter explained, it is desirable to provide the permanent magnet ring 28 to assist in quickly building up the voltage. The ring 28, when used, is permanently magnetized in the direction of its axis, as indicated by the + and − marks thereon, and produces a unidirectional flux generally axially of the machine in the same direction as the flux produced by exciting winding 31. In case the permanent magnet ring 28 is not used, the magnetic stator sections 26 and 27 would abut against each other or be made integral to provide the outer stator magnetic connection between the outer stator sections 18 and 20 as diagrammatically illustrated in Fig. 4.

Structurally, the rotor for this machine comprises two salient pole magnetic rotor parts 32 and 33 mounted on a shaft 34 of nonmagnetic material. The arrangement shown is for a machine having a four-pole alternating-current winding. It will be noted that alternate pole pieces 35 and 36 of the rotor element 32 are spaced 360 electrical degrees, are in alignment with outer stator element 18, and constitute the magnetic rotor element of this stator, and that the remaining pole pieces 37 and 38 of rotor element 32 are in alignment with central stator element 19. Also in alignment with central stator element 19 are alternate pole pieces 39 and 40 of rotor element 33, and the remaining pole pieces 41 and 42 of rotor element 33 are in alignment with outer stator element 20. The pole pieces 37 and 38 lie between the pole pieces 39 and 40 forming four evenly spaced pole pieces comprising the magnetic rotor element for the central stator element, the spacing being 180 electrical degrees. However, rotor pole pieces 37 and 38 are magnetically segregated from rotor pole pieces 39 and 40 except through the central stator element 19. The structure of the two rotor elements is shown a little more clearly in Fig. 3 where they have been illustrated as separated axially.

The unidirectional excitation flux for the machine produced by winding 31 aided by the permanent magnet 28, has a path through stator and rotor which may be described as follows:

Through outer stator elements 27, 28, and 26 to the left, inwardly through magnetic supporting shell 23 into the outer periphery of stator element 18, to the inner periphery of stator element 18 opposite rotor pole pieces 35 and 36 across the air gap into these pole pieces, then to the right through the hub of rotor element 32 and outwardly through pole pieces 37 and 38 into stator element 19 at points opposite these pole pieces, outwardly to the unslotted portion of stator element 19, then peripherally through this stator element to points opposite rotor pole pieces 39 and 40, then inwardly across the air gap into rotor pole pieces 39 and 40, to the right again through the hub portion of rotor element 33, then outwardly through pole pieces 41 and 42 into stator element 20 at points opposite these pole pieces, and outwardly through magnetic shell support 25 into outer shell part 27, thus completing the circuit. Considering the rotor pole pieces where this excitation flux flows inwardly into the rotor as south poles and the rotor pole pieces where this excitation flux flows outwardly into the stator as north poles, poles 35, 36, 39, and 40 are south poles, and 37, 38, 41, and 42 are north poles, as indicated by the designations "S" and "N". It is noted that all rotor poles of the same polarity are in axial alignment and that the north poles are circumferentially half way between the south poles. A diagrammatic illustration of the essential parts of this machine, showing the excitation flux path by arrows, is found in Fig. 4.

It is evident that the arrangement of salient rotor poles and their polarity as thus explained is such as to cooperate with the stator elements to produce four-pole inductor motor or generator operation. It is evident that the inner stator element 19 with its four cooperating rotor poles will produce twice the inductor generator or motor action as can be produced by one of the end stator elements with its two cooperating rotor poles. The extent to which the material is utilized in the two outside inductor machine units of Fig. 2 is the same as that of the two inductor machine units of the prior art apparatus of Fig. 1. However, by adding the central unit in Fig. 2 as described, the capacity of the apparatus is doubled although the extra material that it is necessary to add for thus doubling the capacity of the machine is proportionately very much less.

In the end units, the stator elements 18 and 20 have only about one-half their air gap area utilized at any one time whereas, in the central unit, the stator air gap area is fully utilized. Thus, a substantial reduction in size and weight for a given output or a substantial increase in capacity for a given size and weight of machine is realized by employing this invention in the construction of inductor machines. The economical advantages may be still further increased by adding further units between the end units, as indicated in Fig. 6 where I have represented a machine having two end units 43 and 44 where the stator air gap area may be considered to be utilized 50% and three inner units 45, 46, and 47 where the stator air gap area may be considered to be utilized 100%. Thus, the total stator air gap may be considered to be 80% utilized. In Fig. 4, we may consider the total stator air gap area 66⅔% fully utilized and, in the prior art apparatus of Fig. 1, 50% fully utilized.

In Fig. 6, I have also indicated how the excitation winding may be divided into different coils 48 and placed on the rotor structure. In Fig. 6, I have also represented a six-pole machine to indicate that the invention is not confined to machines of any particular pole number 2N.

In Fig. 5, 22' represents the alternating-current winding of the machine which is made up of the coils, parts 22 of Fig. 2. Such winding may, of course, be single or polyphase. In Fig. 5, it is represented as single-phase and connected to supply a circuit 50. The direct current excitation winding 31 of the machine is supplied from the alternating-current winding through full wave series rectifier units 53 and 54. In the illustration the rectifier unit 53 is supplied from the alternating current terminals of the machine and rectifier unit 54 is supplied from a series transformer 51 in the load line 50 so as to obtain any desired compounding effect. The rectified current is supplied to the exciting winding 31. The permanent magnet 28, Fig. 2, assures that the machine, when used as a self-excited generator, will build up quickly.

The permanent magnet is particularly desirable in a self-excited machine where, as here, we have several air gaps in series in the excitation magnet circuit. Also, the excitation continuously supplied by such permanent magnet permits of a corresponding reduction in the excitation that is necessary to supply electrically. The excitation is, nevertheless, under control as, for example, by including an adjustable resistance 52 in the excitation circuit. Where compounding regulation is unnecessary, the series transformer may be omitted. It is, of course, possible to supply all or a part of the excitation by a separate direct-current exciter, as indicated in Fig. 6.

While the invention is particularly suited for relatively small self-contained generators, such machines may be used as inductor motors.

In accordance with the provisions of the patent statutes, I have described the principle of operation of my invention together with the apparatus which I now consider to represent the best embodiment thereof but I desire to have it understood that the apparatus shown is only illustrative and that the invention may be carried out by other means.

What I claim as new and desire to secure by Letters Patent of the United States, is:

1. An inductor-type dynamo-electric machine comprising a plurality, greater than two, of stator elements in axial alignment, a magnetic connection between the peripheries of the outer stator elements, the inner stator element or elements being magnetically segregated from the outer stator elements, and a salient pole rotor structure for said machine providing excitation flux paths from one end stator element to the other end stator element by way of the inner stator element or elements.

2. An inductor-type dynamo-electric machine comprising a plurality, greater than two, of magnetic stator elements in axial alignment, a magnetic rotor element for each stator element, an alternating-current winding common to all of the stator elements, a magnetic shell connecting the end stator elements and the inner stator elements being magnetically segregated therefrom, one end rotor element having salient magnetic poles of only one polarity and the other end rotor element having salient magnetic poles of only the opposite polarity, the inner rotor elements having salient magnetic poles of both polarities, the salient magnetic poles of like polarity of the different rotor elements being in axial alignment while those of opposite magnetic polarity are in staggered relation, magnetic connections between the salient magnetic poles of unlike polarity of adjacent rotor elements, the salient magnetic poles of unlike polarity in inner rotor elements being magnetically segregated except as flux may pass between them through their stator elements, and means for producing a unidirectional flux serially through all of said stator and rotor elements.

3. An inductor-type dynamo-electric machine comprising three magnetic stator elements in axial alignment, an alternating-current winding common to all of said stator elements, a magnetic shell connecting the outer stator elements, the central stator element being magnetically segregated from the other stator elements and said shell, magnetic rotor elements for each stator element, one end rotor element having salient magnetic poles of only one polarity, the other end rotor element having salient magnetic poles of only the opposite polarity, and the central rotor element having salient magnetic poles of both polarities, the magnetic poles of unlike polarity in the central rotor element being magnetically segregated except as flux may pass between them through the central stator element, magnetic spider portions between the salient magnetic poles of unlike polarity in adjacent rotor elements, and means for producing a unidirectional flux in series relation through said stator and rotor elements, said shell, and said magnetic spider portions.

4. An inductor-type dynamo-electric machine comprising a plurality, greater than two, of axially aligned dynamo-electric machine elements each comprising cooperating magnetic stator and magnetic rotor parts, a multipolar alternating-current winding common to all of the stator parts, a magnetic connection between only the end stator parts, each end rotor part having salient magnetic pole pieces spaced 360 electrical degrees apart with the pole pieces in one end rotor part spaced 180 electrical degrees from the pole pieces in the other end rotor part, the rotor part cooperating with each internal stator part having salient magnetic pole pieces spaced 180 electrical degrees apart and in axial alignment with the pole pieces in the end rotor parts, magnetic connections between only the pole pieces in adjacent rotor parts which are spaced 180 electrical degrees from each other, the pole pieces in each inner rotor part which are spaced 180 electrical degrees being magnetically segregated from each other except through the cooperating inner stator part, common shaft means for supporting all rotor parts, and means for forcing a unidirectional excitation flux in series relation through all of said stator and rotor parts and through said magnetic connections.

5. An inductor-type dynamo-electric machine comprising a pair of end magnetic stator parts, a magnetic connection between said end stator parts, a third magnetic stator part between and in axial alignment with the end stator parts and magnetically segregated therefrom, a multipolar alternating-current winding common to all of said stator parts, a magnetic rotor part cooperating with one of the end stator parts having magnetically connected salient magnetic poles uniformly spaced 360 electrical degrees apart, a similar rotor part cooperating with the other end stator part but having its pole pieces spaced 180 electrical degrees with respect to pole pieces in the first mentioned rotor part, an inner magnetic rotor part cooperating with the third stator part having salient magnetic pole pieces uniformly spaced 180 electrical degrees apart and in axial alignment with the pole pieces in the end rotor parts, the pole pieces in the inner rotor part which are spaced apart 180 electrical degrees being magnetically segregated from each other except through the stator part with which they cooperate, magnetic connections between the pole pieces in adjacent rotor parts which are spaced 180 electrical degrees from each other, common shaft means for all of said rotor parts, and means for producing a unidirectional excitation flux in series relation between all of said stator and rotor parts and through said magnetic connections.

6. A dynamo-electric machine comprising a pair of axially aligned inductor-type dynamo-electric machine elements having magnetic stator and magnetic rotor parts, the stator parts being connected magnetically and the rotor parts each having N magnetically connected salient pole pieces uniformly spaced apart 360 electrical degrees with the pole pieces of one rotor part spaced 180 electrical degrees from the pole pieces in the other rotor part, an inner stator part axially aligned between the magnetically connected stator parts and magnetically segregated therefrom, a 2N pole alternating-current winding common to all of said stator parts N being an integer greater than one, an inner magnetic rotor part cooperating with said inner stator part having 2N salient magnetic pole pieces uniformly spaced 180 degrees apart and in axial alignment with the pole pieces in the other rotor parts, alternate pole pieces of said inner rotor part being magnetically segregated except through the magnetic stator part with which they cooperate, magnetic connections between pole pieces in adjacent rotor parts which are spaced 180 electrical degrees from each other, shaft means for rotating all of said rotor parts as a unit, and means for forcing unidirectional excitation flux through all of said stator and rotor parts and said magnetic connections in series relation.

7. An inductor-type dynamo-electric machine comprising a plurality, greater than two, of magnetic stator parts in axial alignment provided with a common multipolar alternating-current winding, a salient magnetic pole rotor part for each stator, the rotor part for one end stator part having only positive magnetic pole pieces spaced 360 electrical degrees apart and the rotor part for the other end stator part having only negative magnetic pole pieces spaced 360 electrical degrees apart, the rotor part for each inner stator part having both positive and negative magnetic pole pieces spaced 180 electrical degrees apart, the pole pieces of the same magnetic polarity in the different rotor parts being in axial alignment and 180 electrical degrees from the pole pieces of the opposite magnetic polarity, magnetic connections between only the end stator parts and between only the positive and negative pole pieces of adjacent rotor parts, and means for forcing a unidirectional excitation flux in series relation between all of said stator and rotor parts and said magnetic connections to produce the salient pole rotor polarities specified.

8. An inductor-type dynamo-electric generator having a plurality of axially aligned magnetic stator elements, a shell structure of magnetic material connecting the end stator elements, said shell structure including a ring-shaped permanent magnet polarized to produce a unidirectional flux axially of said shell, a direct-current exciting coil concentric with the axis of said machine, an alternating-current generating winding having coils common to all of said stator elements, a magnetic rotor part for each stator part having salient magnetic pole pieces magnetized by flux produced by said permanent magnet and direct-current exciting winding, shaft means for rotating all of said rotor parts as a unit, magnetic connections between pole pieces of adjacent rotor parts selected with respect to their angular position to produce accumulative generator action in the alternating-current winding in all stator elements when the shaft means is driven, a transformer supplied by current generated by said machine, and rectifier means supplied from said transformer for supplying direct current to said exciting coil.

9. A self-excited inductor alternator comprising a plurality of cooperating stator and magnetic rotor parts, an alternating-current winding common to all stator parts, the rotor parts having salient magnetic pole pieces arranged to produce inductor-generator action when the rotor parts are rotated and provided with excitation, a magnetic excitation circuit for said machine including a magnetic shell structure connecting different stator parts and a magnetic connection between different rotor parts, a direct current exciting winding for producing excitation flux for said machine, rectifier means energized from the alternating-current winding of said machine to supply direct current to said exciting winding, and permanent magnet means associated with the magnetic excitation circuit of said machine to assist in building up its excitation flux.

10. An inductor-type dynamo-electric machine comprising three axially aligned magnetic stator elements, the two end stator elements having a magnetic connection between their outer peripheries and being magnetically segregated from the central stator element, an alternating current winding common to all of said stator elements, salient magnetic pole rotor elements cooperating with each stator element, said rotor elements comprising a non-magnetic supporting shaft, two multipolar rotor magnetic structures mounted thereon, one such structure having alternate pole pieces in radial alignment with one end stator element and its remaining pole pieces in radial alignment with the central stator element, the other such structure having alternate pole pieces in radial alignment with the central stator structure between the other pole pieces which are in alignment therewith and having its remaining pole pieces in radial alignment with the other end stator structure, and means for producing a unidirectional excitation flux for said machine in series relation between the cooperating stator and rotor parts, the magnetic connection between the two end stator parts, and through the two multipolar rotor magnetic structures.

11. An inductor-type dynamo-electric machine comprising three stator elements in axial alignment, a magnetic connection between the peripheral portions of the outer stator elements, the central stator element being magnetically segregated from the outer stator elements, a rotor comprising a salient pole magnetic structure having magnetic poles of a given polarity cooperating with one end stator element and with magnetic poles of the opposite polarity cooperating with the central stator element, a second salient pole magnetic structure having magnetic poles of said given polarity cooperating with the central stator element and magnetic poles of the opposite polarity cooperating with the other end stator element, the poles of like polarity in the rotor being in axial alignment and staggered with respect to the remaining rotor poles, and means for producing a unidirectional flux through said stator elements, said magnetic rotor structures, and said magnetic connection in series relation.

12. An inductor-type dynamo-electric machine comprising a plurality of dynamo-electric machine elements, greater than two, in axial alignment, each comprising cooperating stator and magnetic rotor parts, a 2N pole alternating-current winding common to all of said stator parts, N being a number greater than 1, each of the end rotor parts having N salient magnetic poles spaced 360 electrical degrees apart with the poles in one end rotor part, called north poles, spaced 180 electrical degrees angular distance from the poles in the other end rotor part, called south poles, each of the intermediate rotor parts having N salient magnetic north poles and N salient magnetic south poles spaced 180 electrical degrees apart and in axial alignment with the correspondingly designated poles in the end rotor parts, magnetic connections providing a series path for excitation flux for all of the dynamo-electric machine elements, which path is, beginning from the north poles of one end rotor part into its stator part, then to the other end stator part, then into the south poles of the other end rotor part, then into the north poles of the adjacent inner rotor part, then into the stator of such part, then back into the south poles of the same rotor part, then into the north poles of the next adjacent rotor part, and continuing in a similar manner through any additional inner rotor and stator parts until the path is completed to the beginning point, and means for producing a unidirectional flux through said path.

ALEC FISHER.